United States Patent
Chandra et al.

(10) Patent No.: US 8,522,107 B2
(45) Date of Patent: Aug. 27, 2013

(54) METHOD AND APPARATUS FOR RETRANSMISSION MANAGEMENT FOR RELIABLE HYBRID ARQ PROCESS

(75) Inventors: Arty Chandra, Manhasset Hills, NY (US); Narayan Parappil Menon, Syosset, NY (US); Stephen E. Terry, Northport, NY (US); Junsung Lim, Kyunggi (KR)

(73) Assignee: InterDigital Technology Corporation, Wilmington, DE (US)

( * ) Notice: Subject to any disclaimer, the term of this patent is extended or adjusted under 35 U.S.C. 154(b) by 287 days.

(21) Appl. No.: 12/797,917

(22) Filed: Jun. 10, 2010

(65) Prior Publication Data
US 2010/0251058 A1 Sep. 30, 2010

Related U.S. Application Data

(63) Continuation of application No. 11/531,478, filed on Sep. 13, 2006, now Pat. No. 7,761,767.

(60) Provisional application No. 60/729,286, filed on Oct. 21, 2005.

(51) Int. Cl.
*H03M 13/00* (2006.01)

(52) U.S. Cl.
USPC .......................... 714/751; 370/331

(58) Field of Classification Search
USPC ................... 714/748, 751; 370/349
See application file for complete search history.

(56) References Cited

U.S. PATENT DOCUMENTS

| | | | |
|---|---|---|---|
| 6,909,887 B2 * | 6/2005 | Fauconnier et al. | 455/403 |
| 7,079,489 B2 * | 7/2006 | Massie et al. | 370/236 |
| 7,130,295 B2 * | 10/2006 | Kim et al. | 370/349 |
| 7,197,317 B2 * | 3/2007 | Parkvall et al. | 455/452.1 |
| 7,206,332 B2 | 4/2007 | Kwan et al. | |
| 7,286,563 B2 * | 10/2007 | Chang et al. | 370/469 |
| 7,298,730 B2 * | 11/2007 | Wu | 370/349 |
| 7,646,742 B2 * | 1/2010 | Petrovic et al. | 370/328 |

(Continued)

FOREIGN PATENT DOCUMENTS

| | | |
|---|---|---|
| EP | 1 662 690 | 5/2006 |
| JP | 2004-186969 | 7/2004 |

(Continued)

OTHER PUBLICATIONS

Bertoluzzo et al., "Ethernet Networks for Factory Automation," Proceedings of the 2002 IEEE International Symposium on Industrial Electronics, 2002, ISIE 2002, vol. 1, pp. 175-180 (Jul. 8, 2002).

(Continued)

*Primary Examiner* — Esaw Abraham
(74) *Attorney, Agent, or Firm* — Volpe and Koenig, P.C.

(57) ABSTRACT

A method and apparatus for transmitting a packet from a transmitter entity to a receiver entity in a wireless communication system are disclosed. A transmitting entity includes a radio link control (RLC) sublayer and lower layers including a medium access control (MAC) sublayer and a physical layer, where the RLC sublayer provides a protocol data unit (PDU) to the lower layers for transmission. The lower layers using a HARQ entity transmit the PDU to the receiving entity. The RLC sublayer in the transmitting entity, without an indication from an RLC sublayer of the receiving entity, provides the PDU in response to an indication from the lower layers for retransmission.

4 Claims, 6 Drawing Sheets

(56) References Cited

U.S. PATENT DOCUMENTS

| | | |
|---|---|---|
| 2003/0058821 A1 | 3/2003 | Lee et al. |
| 2003/0131124 A1 | 7/2003 | Yi et al. |
| 2003/0200499 A1 | 10/2003 | Khayrallah |
| 2005/0013283 A1 | 1/2005 | Yoon et al. |
| 2007/0226577 A1 | 9/2007 | Lee |
| 2008/0077838 A1 | 3/2008 | Hsu et al. |

FOREIGN PATENT DOCUMENTS

| | | |
|---|---|---|
| WO | 01/24165 | 4/2001 |
| WO | 03/019844 | 3/2003 |
| WO | 2004/100394 | 11/2004 |

OTHER PUBLICATIONS

Cai et al., "Delay Analysis for AIMD Flows in Wireless/IP Networks," Global Telecommunications Conference, 2003. Globecom '03. IEEE, vol. 7, pp. 3221-3225, (Dec. 1, 2003).

Cheng et al., "BMW Overall Architecture and Prototyping," IEEE 49th Vehicular Technology Conference, 1999, vol. 2, pp. 1350-1354, (May 16, 1999).

European Telecommunications Standards Institute, "Universal Mobile Telecommunications System (UMTS); Medium Access Control (MAC) Protocol Specification (3GPP TS 25.321 version 6.5.0 Release 6)," ETSI TS 125 321, V6.5.0, pp. 1-84, (Jun. 2005).

Lilakiatsakun et al., "Enhancing TCP Energy Efficiency for Mobile Hosts," 10th IEEE International Conference on Networks, 2002. ICON 2002, pp. 235-239, (Aug. 27, 2002).

Morikawa et al., "A Feedback Rate Control of Video Stream in Best Effort High-Speed Mobile Packet Network," The 5th International Symposium on Wireless Personal Multimedia Communications, 2002, vol. 2, pp. 807-811, (Oct. 27, 2002).

Third Generation Partnership Project, "Technical Specification Group Radio Access Network; Radio Link Control (RLC) Protocol Specification (Release 6)," GPP TS 25.322, V6.5.0, (Sep. 2005).

Third Generation Partnership Project, "Technical Specification Group Radio Access Network; Radio Link Control (RLC) Protocol Specification (Release 6)," 3GPP TS 25.322, V6.8.0, (Jun. 2006).

Third Generation Partnership Project, "Technical Specification Group Radio Access Network; Radio Link Control (RLC) Protocol Specification (Release 7)," 3GPP TS 25.322, V7.1.0, (Jun. 2006).

Cai et al., "Delay Analysis for AIMD Flows in Wireless/IP Networks," Global Telecommunications Conference, 2003. Globecom '03. IEEE, vol. 7, pp. 322-3225, (Dec. 1, 2003).

Third Generation Partnership Project, "Technical Specification Group Radio Access Network; Radio Link Control (RLC) Protocol Specification (Release 6)," 3GPP TS 25.322, V6.5.0, (Sep. 2005).

Third Generation Partnership Project, "Technical Specification Group Radio Access Network; Radio Link Control (RLC) Protocol Specification (Release 7)", 3GPP TS 25.322, V7.1.0, (Jun. 2006).

* cited by examiner

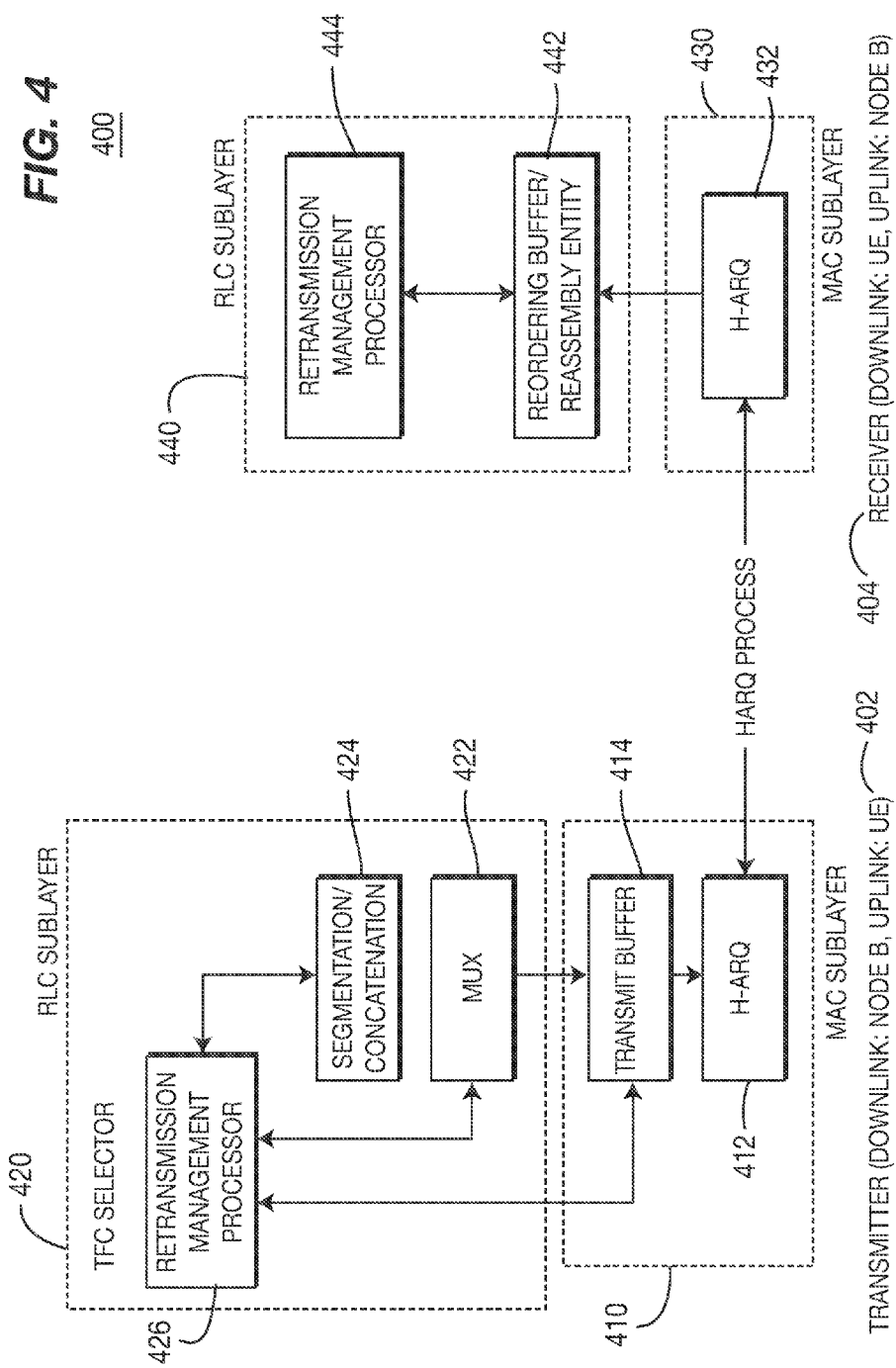

METHOD AND APPARATUS FOR RETRANSMISSION MANAGEMENT FOR RELIABLE HYBRID ARQ PROCESS

CROSS REFERENCE TO RELATED APPLICATION

This application is a continuation of U.S. patent application Ser. No. 11/531,478, filed Sep. 13, 2006, which issued as U.S. Pat. No. 7,761,767 on Jul. 20, 2010, which claims the benefit of U.S. Provisional Application No. 60/729,286, filed Oct. 21, 2005, which is incorporated by reference as if fully set forth herein.

FIELD OF INVENTION

The present invention generally relates to a wireless communication system employing retransmission with a hybrid automatic repeat request (HARQ), and more particularly, to techniques for providing reliable packet delivery with a HARQ mechanism without complexity and unnecessary delay.

BACKGROUND

FIG. 1 shows a retransmission protocol 100 for current WCDMA systems (e.g., WCDMA Release 5/6) in which high speed data transmission can be achieved by means of high speed downlink/uplink packet access (HSDPA/HSUPA) technology. To improve the reliability of data transmission, multiple retransmission loops are enabled therein.

The protocol 100 utilizes a user equipment (UE) 102, a Node B 104, and a radio network controller (RNC) 106. The UE 102 includes a physical (PHY) layer 110, a medium access control (MAC) layer 112, and a radio link control (RLC) layer 114. The Node B 104 includes a PHY layer 120 and a MAC layer 122. The RNC 106 includes a MAC layer 130 and an RLC layer 132.

First, a HARQ process 140 runs in the MAC layers 112, 122 between the UE 102 and the Node B 104. The packets are assigned sequential transmission sequence numbers (TSNs) in a HARQ entity at the transmitter. At the receiver, a corresponding HARQ entity receives the packet transmissions and attempts to decode and recover each transmitted packet. The receiver HARQ entity is tasked with providing the recovered packets to higher layers in the proper order. Since individual packets may require a different number of retransmissions for successful delivery, a reordering entity is used at the receiver to buffer and reorder the packets.

When a packet is not decoded correctly, the receiver sends a negative acknowledgment (NACK) to the transmitter to initiate a retransmission of the packet. Otherwise, the receiver sends an acknowledgment (ACK) for the corresponding packet. Upon receiving a NACK, the transmitter retransmits the corresponding packet if the number of allowed retransmissions for the HARQ packet is less than a predetermined maximum value. Otherwise, the packet is discarded by the HARQ process, and retransmission of the packet is handled by an ARQ process 142 in the RLC layers 114, 132 between the UE 102 and the RNC 106.

The packet may not be correctly received in the RLC layer of the receiver side (i.e., the RLC layer of the UE 102 or the RNC 106) due to a decoding failure in the HARQ process or packet losses between the Node B 104 and the RNC 106. To compensate for these situations, an ARQ process 142 is provided in the RLC layers 114, 132 between the UE 102 and the RNC 106. The packets are assigned sequence numbers (SNs) in the RLC entity at the transmitter similar to the TSNs and the packets are held in a retransmission buffer until the transmitter receives an ACK for the packets from the receiver.

The RLC in the receiver generates status protocol data units (PDUs) containing an ACK or a NACK and sends the PDUs to the transmitter, so that the RLC in the transmitter can retransmit the missing packet or delete the correctly transmitted packet from the retransmit buffer. Some of the packets may not be received correctly after several retransmission attempts in the RLC layer or before a packet discard timer for the packets has expired. The RLC in the transmitter then discards the packets and informs the upper layer and the receiver. The receiver RLC layer reorders the received packets and initiates a procedure for a missing packet.

SUMMARY

The present invention relates to retransmission management applicable to future wireless communication systems, such as a system specified in the third generation partnership project (3GPP) long term evolution (LTE), but is also applicable to other kinds of wireless communication systems providing for reliable packet retransmission. More particularly, the present invention relates to retransmission management of a transmitter/receiver (e.g., wireless transmit/receive unit (WTRU) or base station) and agent (e.g., RNC) for reliable packet reception without loss or error.

The present invention introduces a retransmission management technique to provide reliable data packet delivery with a simple retransmission scheme and to reduce the complexity, latency, and overhead of status reporting in the RLC layer in future communication systems (e.g., LTE). This retransmission scheme reduces packet latency by removing the delay in retransmitting packets from the RLC layer. Layer 2 (RLC and MAC) signaling overhead is also reduced by removing duplicate signaling between the MAC HARQ and RLC acknowledged mode (AM). The status PDUs sent between peer-to-peer RLC layers is also a factor, since it is a non-negligible burden in signaling and degrades spectral efficiencies.

This scheme simplifies implementation by removing duplicate functionalities, such as a reordering buffer and a transmit buffer between the MAC layer and the RLC layer. A MAC+ layer is introduced, which incorporates RLC layer functionalities into the MAC layer. Only one set of sequence numbers is used to synchronize outstanding transmissions (i.e., the number of transmitted but not acknowledged transmissions). To allow for one LTE MAC+ PDU control header applied per transport channel's transmission time interval (TTI), the invention further proposes that transmission sequencing, multiplexing, segmentation, concatenation, and padding are performed at the time of LTE-TFC (transport format combination) selection, rather than in advance of TFC selection as in existing RLC AM operation. L2 control signaling for transmission sequencing, multiplexing, segmentation, and concatenation is applied once per transport channel mapped for each selected LTE-TFC.

A method for transmitting a packet from a transmitter to a receiver in a wireless communication system begins by building a packet by a transport format combination (TFC) selection process, and the packet is transmitted from the transmitter to the receiver. If the HARQ entity at the transmitter receives an indication that the packet was not successfully received at the receiver, the packet is retransmitted via a HARQ procedure. If the HARQ procedure did not successfully transmit the packet, then the packet is retransmitted via a retransmission management (RM) procedure. If the RM procedure did not successfully transmit the packet, then the packet is discarded by the transmitter.

A method for receiving a packet in a wireless communication system begins by successful reception of a packet by a HARQ entity at a receiver. The packet is forwarded to a reordering buffer and reassembly entity, where a TSN of the packet is examined. The packet is delivered to an upper layer if the TSN of the packet indicates that the packet was received in an expected order. The packet is also delivered to an upper layer if an out-of-sequence timer (T_deliver) expires. The packet may be discarded by the reordering buffer and reassembly entity if the TSN of the received packet is lower than the expected TSN.

A system for retransmission management of packets in a wireless communication system includes a transmitter and a receiver. The transmitter includes a TFC selector having a segmentation/concatenation processor and a multiplexer, a transmit buffer connected to the multiplexer, an RM processor connected to the TFC selector, and a HARQ processor connected to the transmit buffer and the RM processor. The receiver includes a HARQ processor, a reordering buffer and reassembly entity connected to the HARQ processor, and an RM entity.

A method for suspending data transmission from a transmitter to a receiver in a wireless communication system begins by determining at the transmitter if a suspend condition exists. A suspend condition can exist due to poor channel conditions or a handover, for example. Data transmission from the transmitter to the receiver is suspended if the suspend condition exists. A determination is made at the receiver if a resume condition exists, and data transmission from the transmitter to the receiver is resumed if the resume condition exists.

BRIEF DESCRIPTION OF THE DRAWINGS

A more detailed understanding of the invention may be had from the following description of a preferred embodiment, given by way of example, and to be understood in conjunction with the accompanying drawings, wherein:

FIG. 4 is a block diagram of a MAC+ layer with an RLC sublayer;

DETAILED DESCRIPTION OF THE PREFERRED EMBODIMENTS

Hereafter, a user equipment (UE) includes, but is not limited to, a wireless transmit/receive unit (WTRU), a mobile station, a fixed or mobile subscriber unit, a pager, or any other type of device capable of operating in a wireless environment. When referred to hereafter, a base station includes, but is not limited to, a Node B, an enhanced Node B (eNode B), a site controller, an access point, or any other type of interfacing device in a wireless environment.

The present invention introduces a protocol architecture containing a retransmission loop called "HARQ with retransmission management (RM)". The proposed radio interface is layered into two protocol layers for the user plane: the PHY layer, and the MAC layer between the WTRU and the base station. The present invention does not include an RLC layer, and the functionalities of the RLC layer in the RNC in 3GPP Release 5/6 are merged into the MAC layer, and is herein referred to as a "MAC+" layer. The MAC+ layer provides support for data transmission modes (e.g., transparent mode (TM), unacknowledged mode (UM), and acknowledged mode (AM)) similar to the existing RLC layer in 3GPP Release 5/6.

Figure 1:
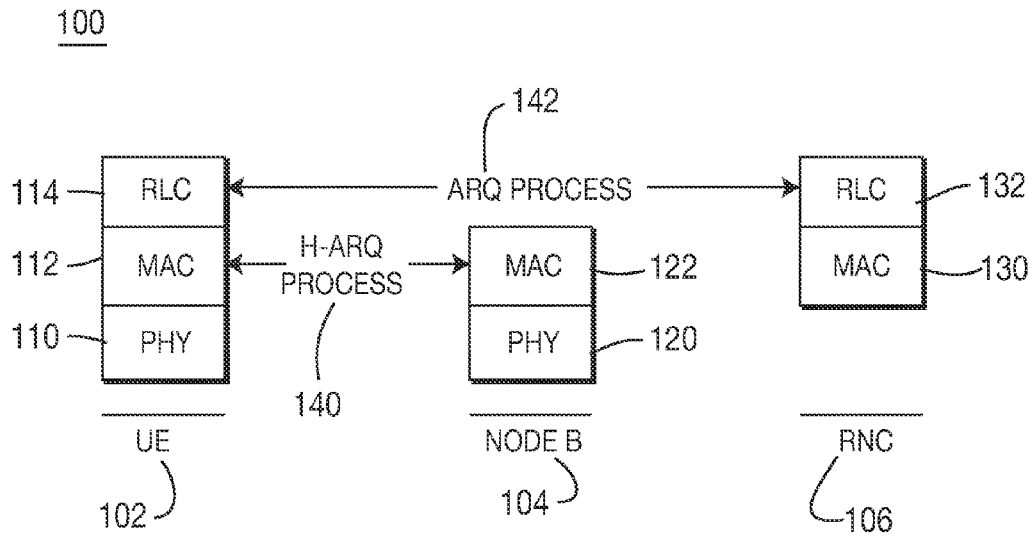
FIG. 1 is a diagram of a retransmission protocol for current WCDMA systems.
Figure 2:
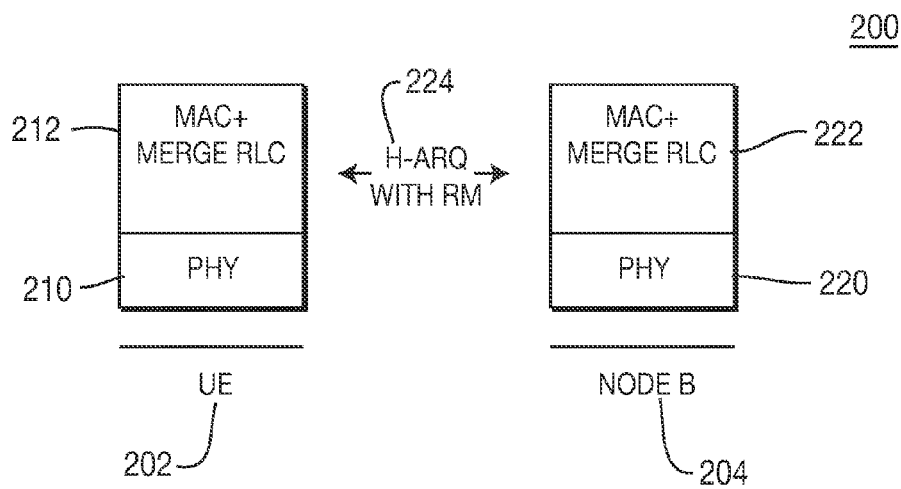
FIG. 2 is a diagram of a retransmission protocol for a MAC+ layer with a merged RLC layer.

FIG. 2 shows a protocol structure 200 for the MAC+ layer; only the entities pertaining to retransmission are discussed herein. The structure 200 includes a UE 202 and a Node B 204. The UE 202 includes a PHY layer 210 and a MAC+ layer 212. The Node B includes a PHY layer 220 and a MAC+ layer 222. The MAC+ layers 212, 222 may include additional entities to handle functionalities other than retransmission. One difference between the structure 200 and 3GPP Release 5/6 is that the ARQ process in the RLC layer does not exist in the structure 200, and retransmission by the HARQ process is modified for reliable data delivery. Preferably, an additional retransmission loop in the HARQ process is provided by the transmitter and is handled by retransmission management (RM) 224. An inner-loop process dictates retransmission in the HARQ and an outer-loop process dictates retransmission handled by RM.

Figure 3:
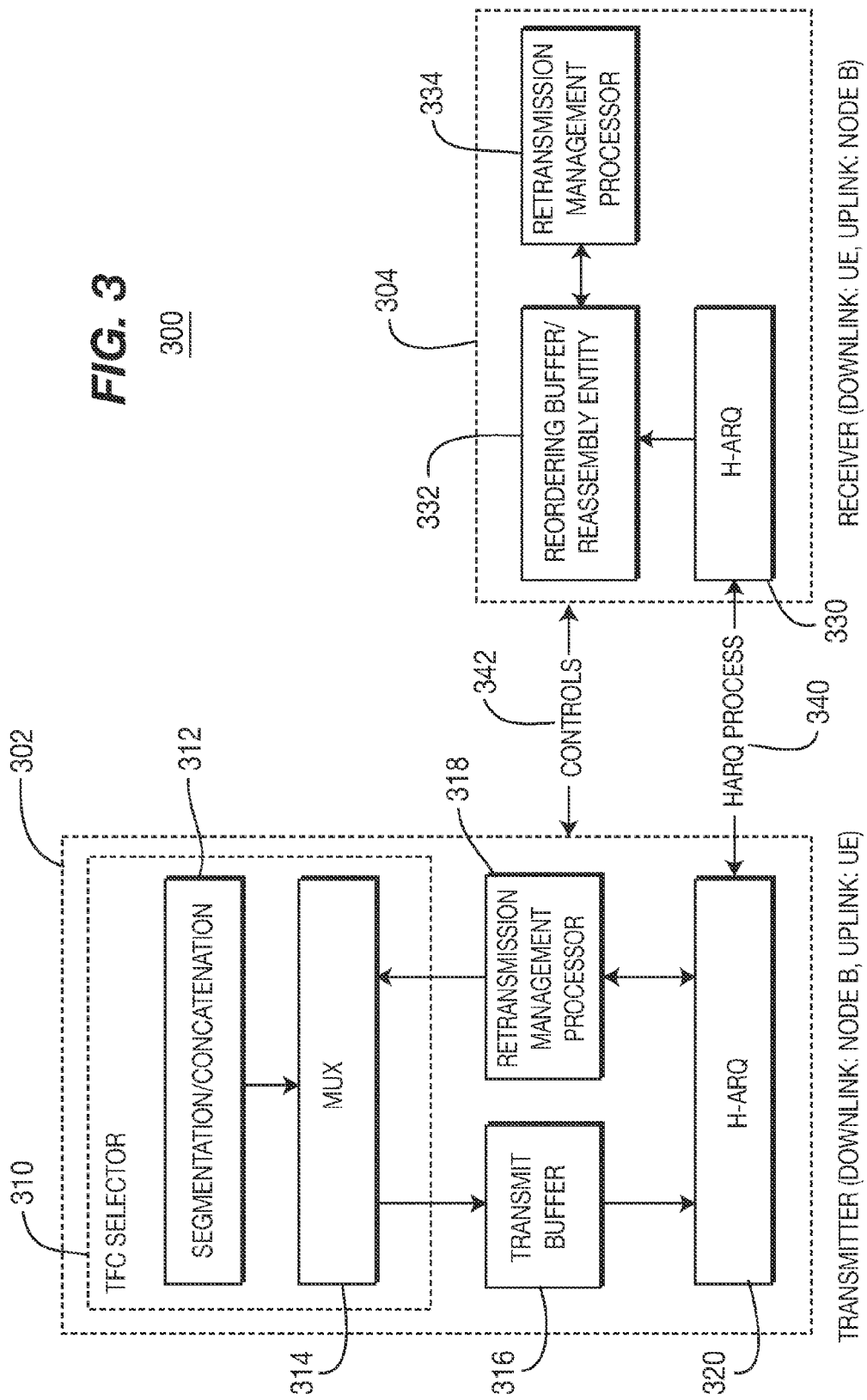
FIG. 3 is a block diagram of a MAC+ layer.

FIG. 3 is a block diagram of a system 300 including a transmitter 302 and a receiver 304 communicating according to a MAC+ layer protocol. On downlink signals, the base station is the transmitter and the UE is the receiver. For an uplink signal, the UE is the transmitter and the base station is the receiver.

The transmitter 302 includes a TFC selector (packet size selector) 310, a segmentation/concatenation processor 312, a multiplexer (MUX) 314, a transmit buffer 316, a retransmission management (RM) processor 318, and a HARQ entity 320. The segmentation/concatenation processor 312 and the MUX 314 are located within the TFC selector 310. The receiver 304 includes a HARQ entity 330, a reordering buffer and reassembly entity 332, and an RM processor 334. The HARQ entities 320, 330 communicate with each other via a HARQ process 340 and the transmitter 302 and the receiver 304 communicate with each other via control signals 342.

The TFC selector 310 decides the packet size and the data flows that are multiplexed in a TTI. A packet may consist of retransmitted data and/or new data. Each data flow has its own segmentation/concatenation processor 312, and there is only one MUX 314 per UE. The segmentation/concatenation processor 312 segments and concatenates the data from an upper layer as a unit specified by the TFC selector 310. The MUX 314 performs multiplexing of different flows of packets from an upper layer, as specified by the TFC selector 310. The transmit buffer 316 stores packets for less than a TTI before sending them to the HARQ entity 320. Packets which failed to transmit correctly by the HARQ process 340 may be retransmitted based on a decision from the RM processor 318, and may have a higher priority than new transmissions.

Each packet is associated with a TSN. A TSN is created for new packets and a retransmitted packet may retain its original TSN. The TSN is the identity assigned to each packet by the transmitter 302 for transmissions and retransmissions and is used by the receiver 304 for reordering the packets. Hence, the TSN can be a combination of upper layer sequence number(s) and the sequence number of the multiplexed or segmented packet(s). The TSN can also be a combination of the upper layer sequence number(s) with the byte offset to identify each segment of the upper layer packet(s).

The HARQ entity 320 handles the HARQ functionality in the transmitter 302. Multiple HARQ processes can be supported by the HARQ entity 320. In the HARQ protocol, the transmitter 302 waits for an ACK from the receiver 304 for the packet before retransmission. The maximum number of retransmissions by the HARQ process 340 is denoted as N_HARQ, which can be a predetermined value or a changeable value configured by an upper layer or by the RM processor 318. N_HARQ is based on the data flow (data that is multiplexed within a transmission) which is related to a specific quality of service (QoS) requirement for latency and a block error rate (BLER) target. The HARQ entity 320 informs the RM processor 318 whether or not a packet was sent successfully.

The RM processor 318 manages outer-loop retransmission for packets that fail successful transmission by the HARQ process 340. The failed packets during a HARQ transmission can be held in the RM processor 318. The RM processor 318 sends an indication to the TFC selector 310, which uses this information to build a new packet. A number of maximum outer-loop retransmissions N_DAT can be configured and changed by the RM processor 318, by an upper layer, or be predetermined for each data type. The TFC selector 310 can control the selection of the adaptive modulation and coding scheme. Another possibility is for a central entity in the network to indicate an appropriate constellation and coding scheme that is selected according to channel conditions.

In a separate embodiment, a control signal 342 between the transmitter 302 and the receiver 304 contains status information. The transmitter 302 sends the status information (TSNs of discarded packets) when it discards packets, whereby the receiver 304 delivers the received packets to an upper layer without waiting to receive the discarded packets. A control signal sent by the receiver 304 sends the status of the received packets. The status generation signal may also be used to indicate reception of HARQ packets instead of sending immediate ACK/NACK feedback.

Another possibility is to send the TSN as part of the control information over the air for each HARQ process. Hence, the HARQ transmitter identifies the packet in a HARQ process by the TSN. The HARQ receiver may use the TSN to identify lost HARQ packets and for ACK/NACK indication.

In the receiver 304, the HARQ entity 330 receives the packets and forwards the packets to the reordering buffer and reassembly entity 332. The reordering buffer and reassembly entity 332 ensures that the packets are received and are in the proper order based on the TSN of each packet. The reordering buffer and reassembly entity 332 builds concatenated packets and reorders the packets. A packet is sent to the upper layer if it is received in the expected order or if an out-of-sequence timer expires.

FIG. 4 is a block diagram of a protocol architecture 400 containing TFC selection in an RLC sublayer. The architecture 400 can be implemented in connection with a transmitter 402 and a receiver 404. The transmitter 402 includes a MAC sublayer 410 having a HARQ entity 412 and a transmit buffer 414, and an RLC sublayer 420 with TFC selection having a MUX 422, a segmentation/concatenation processor 424, and an RM processor 426. In this case, the RLC sublayer 420 performs TFC selection every TTI and manages retransmission based on an indication from the MAC sublayer 410. The receiver 404 includes a MAC sublayer 430 having a HARQ entity 432, and an RLC sublayer 440 having a reordering buffer and reassembly entity 442 and an RM processor 444.

The following RM timers can be implemented by the RLC sublayers 420, 440 or by the RM processors 426, 444.

T_discard is a timer that counts the lifetime of a packet. The timer starts when a packet arrives at the transmitter 402, and can be incremented every TTI or decremented from a predetermined value T_discard_th (which is defined below).

T_suspend is a timer that is incremented every TTI after the RM processor 426 suspends data transmission to the receiver 404.

T_deliver is a timer present at the reordering buffer and reassembly entity 442 of the receiver 404 and starts after detecting a missing packet.

The following RM parameters can be configured by the upper layer or by the RM processor 426, 444 depending on the data types or priorities. Time-sensitive data may have lower thresholds, for example in video telephony as compared to non-real time services.

T_discard_th is a maximum time that a data packet is held in the transmitter 402. A data packet will be discarded once the T_discard timer exceeds T_discard_th.

T_suspend_th is a maximum time duration of data suspension by the RM processor 426, which can suspend data transmission to a receiver 404 and resume transmissions when the timer T_suspend exceeds T_suspend_th.

T_deliver_th is a maximum waiting time for a missing packet. The reordering buffer and reassembly entity 442 at the receiver 404 delivers the out of sequence received packet if the missing packet is not delivered within a T_deliver_th period of time.

N_HARQ_RETX is a maximum number of retransmissions by the HARQ process.

N_RM_RETX is a maximum number of retransmissions from the RM processor 426 (outer loop retransmission). A counter is incremented every time a packet is scheduled to be transmitted by the RM processor 426.

T_stop is a time duration for suspending data transmission. If the number of failed packets during this duration is greater than a predetermined value, the RM processor 426 can suspend data transmission to the receiver 404.

The following describes a method of outer-loop retransmission associated with HARQ. The transmitter 402 retransmits a failed packet of a previous HARQ transmission by RM or RLC without exchanging status PDUs (i.e., ACK or NACK) from the receiver 404. The packets not correctly transmitted via HARQ transmissions are sent to the RLC sublayer 420 for retransmission. Retransmitted packets preferably have a higher priority than new packets that have not been previously scheduled. Alternatively, the retransmitted packets have the same priority as the new packets and will be buffered at the end of the transmission queue.

In another implementation, the transmit buffer 414 removes the packet from the transmit queue even if it is not successfully transmitted by HARQ. All the packets are saved by the RM processor 426, and can be sent to the transmit buffer 414 for retransmission.

Additionally, the RM processor 426 or the RLC sublayer 420 has the capability of determining the number of outer-loop retransmissions for a packet depending on its required QoS. In 3GPP Release 5/6, the RLC layer has different entities for the different modes: transparent mode (TM), unacknowledged mode (UM), and acknowledged mode (AM). The RLC sublayer 420 operates the HARQ process only for the data transmission in AM mode.

The receiver's reordering buffer and reassembly entity 442 can deliver the packets to an upper layer without reordering and recovering or in sequential order. When delivering packets without reordering and recovering, the reordering buffer and reassembly entity 442 sends the received packets to the upper layer instantaneously after reassembly. When delivering packets in sequential order, the reordering buffer and reassembly entity 442 reorders the received packets and waits until the missing packet can be received during T_deliver. After T_deliver expires, the missing packets can be discarded and the reordering buffer and reassembly entity 442 delivers the rest of the packets in sequence.

The RLC sublayer 420 has the capability to control modulation and coding rates for data transmission to a particular receiver 404. The RLC sublayer 420 decides the constellation of modulation/coding rate with TFC selection based on the channel conditions, packet failure rate, MIMO technique, etc.

Figure 5A:
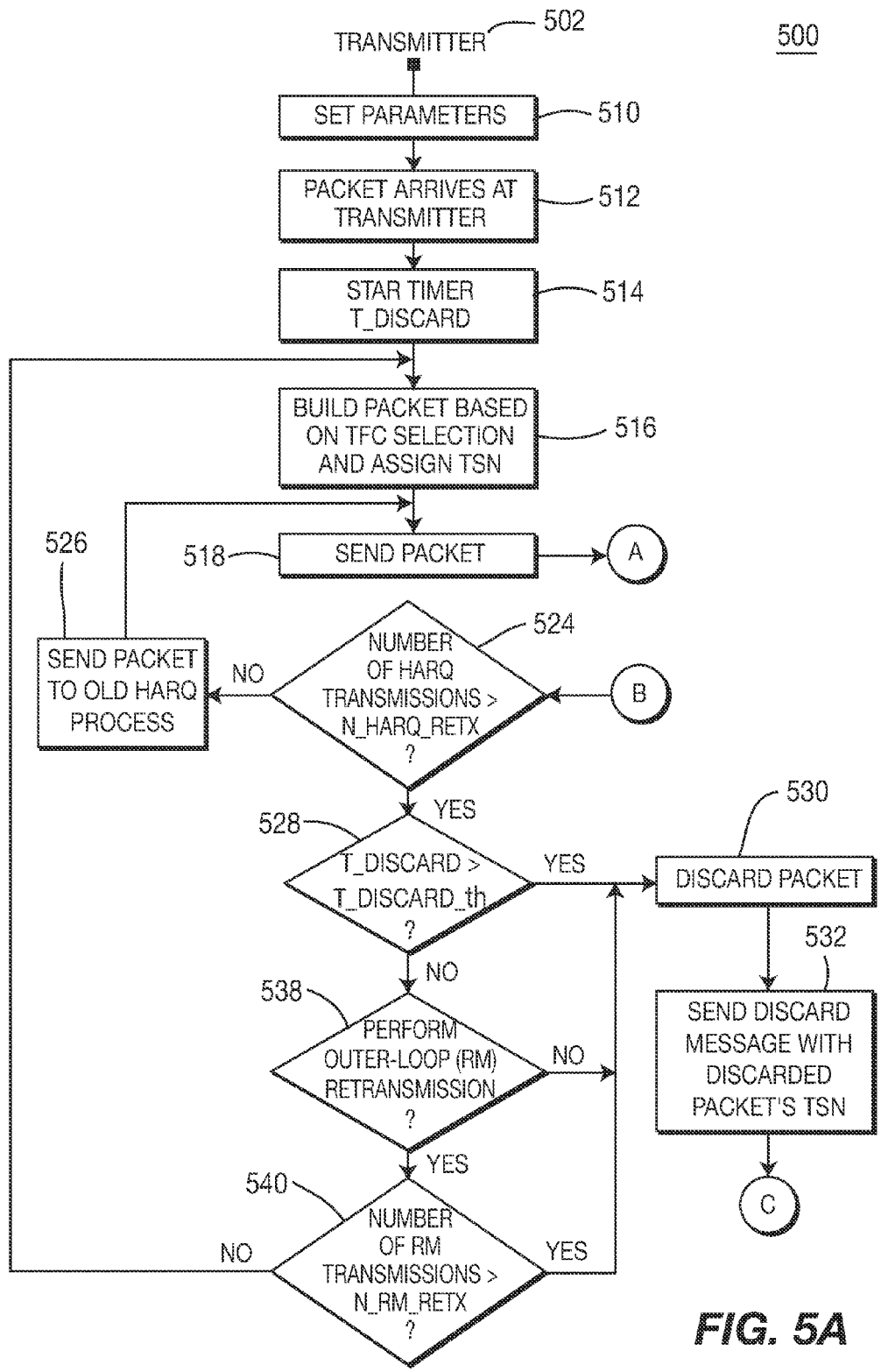
FIGS. 5A and 5B are flow diagrams of a transmitter and a receiver operating according to the retransmission scheme.
Figure 5B:
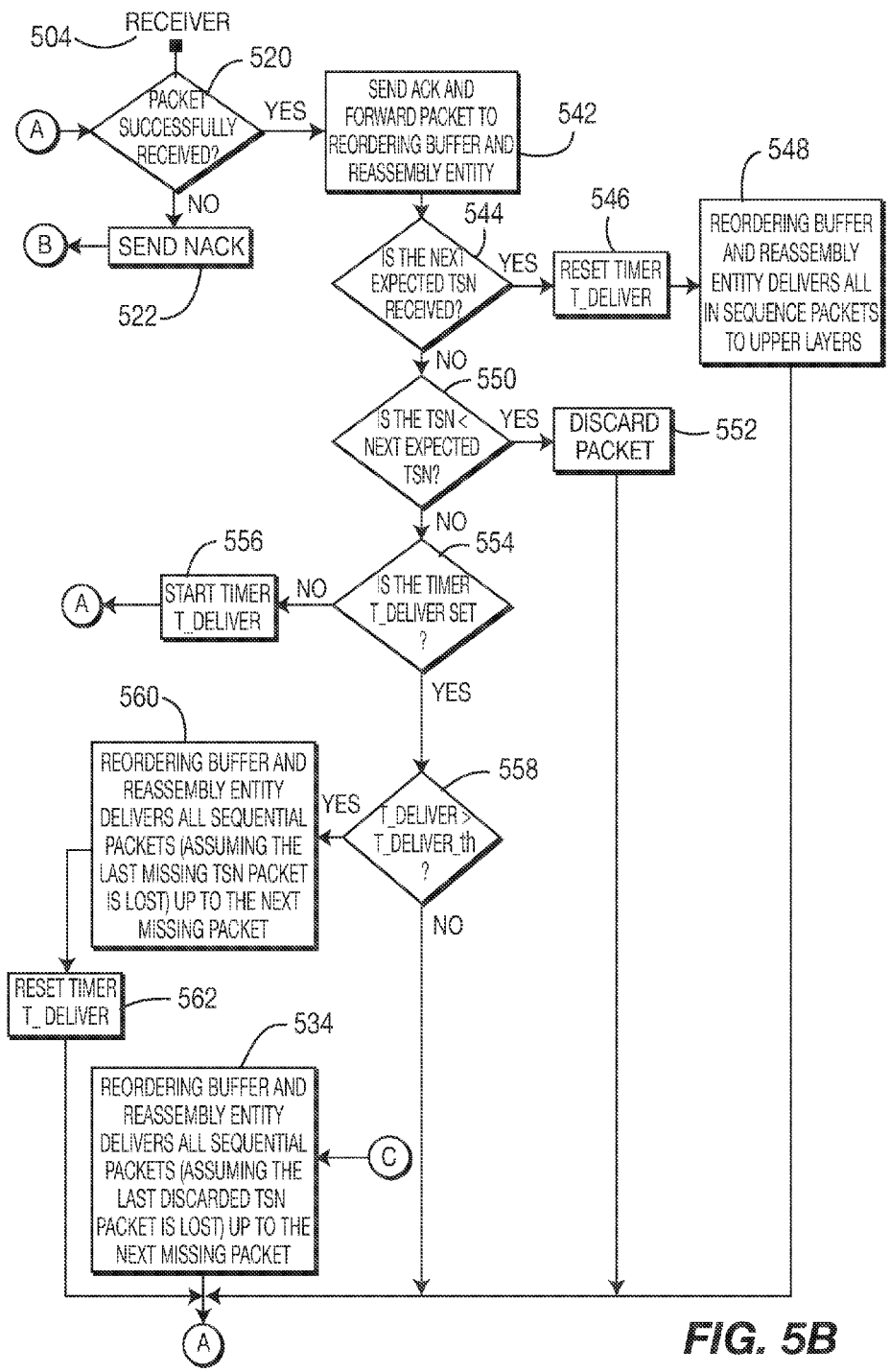

FIGS. 5A and 5B are flow diagrams of a retransmission method 500 as implemented in a transmitter 502 and a receiver 504. The method 500 begins with the transmitter 502 setting parameters (step 510). A packet arrives at the transmitter (step 512) and the transmitter starts the timer T_discard (step 514). Based on the TFC selection, a packet is built and a TSN is assigned to the packet (step 516). The packet is then sent to the receiver 504 (step 518).

At the receiver 504, a determination is made whether the packet was successfully received (step 520). If the packet was not successfully received, then the receiver sends a NACK to the transmitter (step 522). After receiving a NACK at the transmitter 502, a determination is made whether the number of HARQ transmissions exceeds the maximum number of allowed retransmissions, per the parameter N_HARQ_RETX (step 524). If the current number of HARQ transmissions is less than the maximum, then the packet is resent via the old HARQ process (step 526) and the method continues by sending the packet (step 518) as described above.

If the number of HARQ transmissions exceeds the maximum number of allowed retransmissions (step 524), the timer T_discard is compared against the threshold T_discard_th to determine if the timer has expired (step 528). If the timer T_discard has expired, then the transmitter 502 discards the packet (step 530). A discard message is sent to the receiver 504 with the discarded packet's TSN (step 532). The discard message can contain the TSN of a discarded packet and/or the number of consecutive packets discarded following the discarded packet. Upon receiving the discard message, the reordering buffer and reassembly entity in the receiver 504 delivers the out of sequence packets to the upper layers (without the discarded packets; step 534), and the receiver 504 waits for the next packet (step 520).

If the discard timer T_discard has not expired (step 528), then a determination is made whether to perform outer-loop (RM) retransmission (step 538). If the RM retransmission process is not to be performed, then the packet is discarded (step 530) and the method continues as described above.

If RM retransmission is to be performed (step 538), then the current number of RM retransmissions is checked against the maximum number of allowed transmissions, N_RM_RETX (step 540). The parameter for outer-loop retransmission N_RM_RETX is set to zero or to a non-zero value according to the following protocol. For N_RM_RETX=0, there is no outer-loop retransmission, the RM processor does not retransmit a packet that was unsuccessfully transmitted by the HARQ process, and the packet is discarded. The RM processor may configure N_RM_RETX for the packets which were configured as the transparent mode (TM) or the unacknowledged mode (UM) in 3GPP Release 5/6. When N_RM_RETX is a non-zero value, each data packet may have a different value of N_RM_RETX configured by the network. Typically, a lower value of N_RM_RETX is selected for time sensitive data.

If the current number of RM retransmissions exceeds the threshold, then the packet is discarded (step 530) and the method continues as described above. If the current number of RM retransmissions is below the threshold (step 540), then the packet is resent via TFC selection (step 516) as described above.

If the receiver successfully receives a packet (step 520), an ACK is sent to the transmitter 502 and the packet is forwarded to the reordering buffer and reassembly entity (step 542). The received packet is checked to determine if its TSN is the next expected TSN (i.e., the next sequential packet; step 544). If the TSN is the next expected TSN, then the timer T_deliver is reset to zero (step 546) and the reordering buffer and reassembly entity delivers all of the in-sequence packets to the upper layers (step 548) and the receiver 504 waits for the next packet (step 520).

If the TSN is not the next expected TSN (step 544), a determination is made whether the TSN is less than the next expected TSN (step 550). If the TSN is less than the next expected TSN, then the packet is discarded (step 552) and the receiver 504 waits for the next packet (step 520).

If the TSN is not less than the next expected TSN (step 550), a determination is made whether the timer T_deliver is set (step 554). If the timer T_deliver is not set, then the timer is started (step 556) and the receiver 504 waits for the next packet (step 520).

If the timer T_deliver has already been started (step 554), then the timer T_deliver is checked to determine whether it has exceeded the maximum allowed delivery time, T_deliver_th (step 558). If the timer T_deliver has not expired, then the receiver 504 waits for the next packet (step 520).

If the timer T_deliver has expired (step 558), then the reordering buffer and reassembly entity delivers all of the sequential packets, except for the missing packet, to the upper layers and sets the next expected TSN accordingly (step 560). The timer T_deliver is reset to zero (step 562) and the receiver 504 waits for the next packet (step 520).

Alternatively, if the missing packet is received in the reordering buffer and reassembly entity after the timer T_deliver expires, the packet can be delivered to the upper layer depending on the implementation. If the packet is ignored, the receiver 504 transmits the TSN of the missing packet via control signaling when it delivers the packets (except the missing packet) so that the packet is discarded at the transmitter 502.

In an alternate embodiment, the NACKed packet will be retransmitted until it has been successfully received by the receiver 504, and the steps 520-562 of the method 500 will not be performed.

Figure 6:
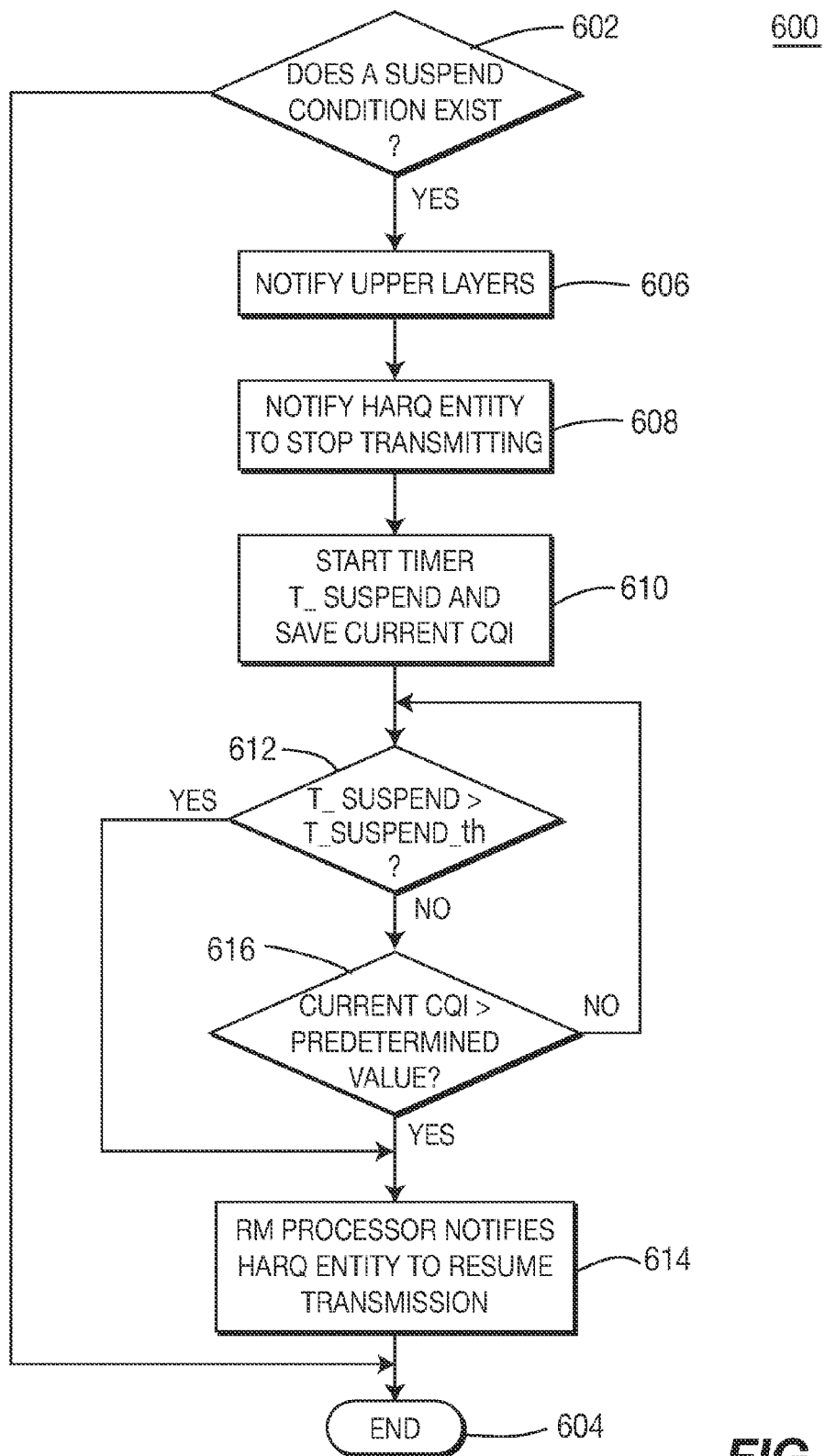
FIG. 6 is a flowchart of a method for suspending and restarting transmission to a receiver.

FIG. 6 is a flowchart of a method 600 for suspending and restarting transmission to a receiver. First a determination is made whether a suspend condition exists (step 602). The RM processor can suspend data transmission to the receiver for the following conditions:

(1) The lowest constellation and highest coding rate are assigned for data transmission to the receiver.

(2) The reported channel quality indicator (CQI) is lower than a predetermined value. The RM processor can save the CQI (referred to as a "suspended CQI") when data transmission is suspended.

(3) The transmitter does not receive an ACK for the transmitted packets after N_HARQ_RETX retransmissions.

(4) The transmitter does not receive an ACK for the transmitted packets after N_RM_RETX retransmissions in outer-loop RM.

(5) A predetermined number of consecutive packets transmitted to the receiver were not ACKed via HARQ transmission.

(6) The number of packets (may not be consecutive) which do not receive an ACK via HARQ transmission exceeds a predetermined value during the time duration T_stop.

(7) A handover process has started.

If a suspend condition does not exist, the method terminates (step 604). If a suspend condition exists, then the RM processor notifies the upper layers (step 606) and notifies the HARQ entity to stop transmitting to the receiver (step 608). The RM processor then starts the timer T_suspend and saves the current CQI (step 610).

Transmission to a suspended receiver can be resumed under one of two conditions. A determination is made whether the timer T_suspend has expired by comparing it to the threshold T_suspend_th (step 612). If the timer T_suspend has expired, then the RM processor notifies the HARQ entity to resume transmission to the receiver (step 614) and the method terminates (step 604). If the timer T_suspend has not expired (step 612), a determination is made whether the current CQI is greater than a predetermined value (step 616). The predetermined value can be either an absolute value or a relative value related to the suspended CQI.

If the current CQI is greater than the predetermined value, then the RM processor notifies the HARQ entity to resume transmission to the receiver (step 614) and the method terminates (step 604). If the current CQI is less than the predetermined value (step 616), then the method continues with step 612 as described above.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A user equipment comprising:
    at least one processor configured to implement a radio link control (RLC) sublayer and lower layers including a medium access control (MAC) sublayer and a physical layer; wherein the at least one processor is configured such that the RLC sublayer provides a protocol data unit (PDU) to the lower layers for transmission; wherein the at least one processor is further configured such that the lower layers using a HARQ entity transmit the PDU to a base station; wherein the at least one processor is further configured such that the RLC sublayer, without an indication from an RLC sublayer of a network, provides the PDU in response to an indication from the lower layers for retransmission, wherein the RLC sublayer comprises an acknowledge mode (AM) RLC entity and the providing of the PDU for transmission and retransmission is by the AM RLC entity.

2. The user equipment of claim 1 wherein the indication from lower layers is from the HARQ entity.

3. A network node comprising:
    at least one processor configured to implement a radio link control (RLC) sublayer and lower layers including a medium access control (MAC) sublayer and a physical layer; wherein the at least one processor is configured such that the RLC sublayer provides a protocol data unit (PDU) to the lower layers for transmission; wherein the at least one processor is further configured such that the lower layers using a HARQ entity transmit the PDU to a base station; wherein the at least one processor is further configured such that the RLC sublayer, without an indication from an RLC sublayer of a network, provides the PDU in response to an indication from the lower layers for retransmission, wherein the RLC sublayer comprises an acknowledge mode (AM) RLC entity and the providing of the PDU for transmission and retransmission is by the AM RLC entity.

4. The network node of claim 3 wherein the indication from lower layers is from the HARQ entity.

* * * * *